United States Patent [19]

Garrick

[11] Patent Number: 5,067,270
[45] Date of Patent: Nov. 26, 1991

[54] METHOD AND APPARATUS FOR DISPENSING LIVE FISHING BAIT

[75] Inventor: James C. Garrick, Grove Hill, Ala.

[73] Assignee: Judges Kricket Kisser, Inc., Grove Hill, Ala.

[21] Appl. No.: 512,171

[22] Filed: Apr. 20, 1990

[51] Int. Cl.⁵ .............................................. A01K 97/04
[52] U.S. Cl. .................................................... 43/55
[58] Field of Search ........................................ 43/4, 55

[56] References Cited

U.S. PATENT DOCUMENTS

| | | | |
|---|---|---|---|
| 2,568,602 | 9/1951 | Anderson | 43/55 |
| 2,579,549 | 12/1951 | Cave | 43/55 |
| 2,587,899 | 3/1952 | Rhodes | 43/55 |
| 2,745,209 | 5/1956 | Kimball | 43/55 |
| 2,786,297 | 3/1957 | Simmons | 43/55 |
| 2,857,705 | 10/1958 | Woodcock | 43/55 |
| 2,883,788 | 4/1959 | Stitt | 43/55 |
| 3,015,905 | 1/1962 | Everett | 43/55 |
| 3,308,570 | 3/1967 | Horton | 43/4 |
| 4,030,226 | 6/1977 | Shelton | 43/55 |
| 4,110,931 | 9/1978 | Maness | 43/55 |
| 4,207,993 | 6/1980 | Ellis | 43/55 |
| 4,815,230 | 3/1989 | Allen | 43/55 |
| 4,825,577 | 5/1989 | Brannon | 43/55 |

Primary Examiner—Kurt Rowan
Attorney, Agent, or Firm—Bradford E. Kile; Ruffin B. Cordell

[57] ABSTRACT

A confinement and dispensing method and apparatus of the type for use with live fishing bait including a storage chamber and a containment and hooking chamber wherein the containment and hooking chamber comprise a hooking station and a slot extending longitudinally along the hooking station.

17 Claims, 2 Drawing Sheets

000
METHOD AND APPARATUS FOR DISPENSING LIVE FISHING BAIT

BACKGROUND OF THE INVENTION

This invention relates to a novel fishing bait dispensing method and apparatus. More specifically, this invention relates to a fishing bait confinement and dispensing method and apparatus operable to store and facily dispense on site live crickets, grasshoppers, and the like.

In the fishing industry, crickets, grasshoppers and other insects are successfully used as bait. It is desirable to securely thread the bait onto a fishing hook while keeping the bait alive and intact and thus more lifelike to fish. Difficulties have been encountered in the past in storing, handling and impaling live bait on a fishing hook because handling a fishing rod and simultaneously attempting to catch bait within a container and then thread the bait onto a hook can be a cumbersome task.

Previously, anglers stored a hundred or so live insects in an open mesh pail or likewise ventilated cage. When it was time to bait a hook, the top of the container would be opened and the angler would insert his hand to catch a single insect and manually threaded the insect onto a fishing hook. However, the lively behavior of a cricket or grasshopper, when placed in a conventional bait box, made capture and threading of the cricket on a hook difficult. Moreover, the live bait had to be stored in a closed box to prevent escape and, upon opening the box, it was not unusual for some of the bait to hop out or climb away from the box before a cricket could be captured.

Problems of the above nature were remedied by constructing bait containers which included a dispensing valve to limit passage of bait from the container to a single insect. However, the insect was oftentimes crushed or otherwise damaged by the angler when he attempted to thread the bait onto the hook, and thus reliable impalement remained a problematic procedure.

In the more recent past, fishing bait containers made it unnecessary for an angler to physically contact the bait during impalement. These containers usually included an outlet and an adjacent gripping element which could be independently manipulated to grip the bait for impalement on a hook. However, such containers with bait grippers were not always convenient to operate because the angler had to manually position the bait adjacent to the gripping element and then manipulate the gripping element to clutch the bait. Manipulation of this gripping element in concert with controlling and handling a fishing rod, a fishing hook, and the bait container itself remained difficult. One recent device of thus type included a generally cylindrical chamber that included a flap gate to limit movement of a cricket. Even in this device, however, movement of a live cricket was possible. Moreover the flap gate was not always reliable and in many instances a cricket would not readily pass beyond the gate.

Another problem associated with previously known bait dispensing containers concerned the method of immobilizating bait in a posture appropriate for impalement. Anglers were forced to rely upon the natural instincts of the insects to crawl towards light the filtering in through the outlet of the container to initially position themselves for impalement. If the insect did not position itself, the angler inverted the dispensing container to position the insects in the outlet via the force of gravity. The time associated with utilization of these bait containers was not satisfactory. Further, once the bait was in position for impalement, the angler sometimes misthreaded or insecurely fastened the bait onto the fishing hook.

The difficulties suggested in the preceding are not intended to be exhaustive but rather are among many which may tend to reduce the effectiveness and user satisfaction associated with prior bait dispensing methods and containers. Other noteworthy problems may also exist; however, those presented above should be sufficient to demonstrate that bait dispensers appearing in the past will admit to worthwhile improvement.

OBJECTS and BRIEF SUMMARY OF THE INVENTION

Objects

It is therefore a general object of the invention to provide a novel fishing bait confinement and dispensing method and apparatus which will obviate or minimize difficulties of the type previously described.

It is a specific object of the invention to provide a fishing bait confinement and dispensing method and apparatus which permits impalement of bait on a fishing hook with minimal angler effort by an easily repeatable, time-efficient method.

It is another object of the invention to provide a fishing bait confinement and dispensing method and apparatus which immobilizes the bait in a posture appropriate for impalement.

It is still another object of the invention to provide a fishing bait containment and dispensing method and apparatus which permits impalement of bait on a fishing hook without requiring a user to manipulate or even contact the live bait with an angler's hands.

It is a further object of the invention to provide a fishing bait confinement and dispensing method and apparatus which permits positioning of a single cricket or the like for impalement while insuring containment, without loss of remaining crickets within a container.

It is yet a further object of the invention to provide a fishing bait confinement and dispensing method and apparatus which may be conveniently stored in an easily accessible location and thus permit expeditious impalement of bait.

It is still a further object of the invention to provide a fishing bait confinement and dispensing method and apparatus which is easy to clean and maintain in a serviceable relatively hygienic condition.

It is yet another object of the invention to provide a fishing bait confinement and dispensing method and apparatus which is portable, lightweight, rust-proof, cost-effective and easily manufactured.

It is another specific object of the invention to provide a fish bait confinement and dispensing apparatus which has a minimum number of moving parts.

It is a further specific object of the invention which facily permits an angler to selectively force live bait into the hooking station.

It is yet a further object of the invention to provide a novel fishing bait confinement which is suitable to immobilize a cricket or other fish bait at a hooking station to facilitate hooking action by an angler.

BRIEF SUMMARY OF A PREFERRED EMBODIMENT OF THE INVENTION

A preferred embodiment of the invention which is intended to accomplish at least some of the foregoing objects includes a storage chamber fashioned with air ventilation passages through its sidewall to operably contain and preserve live bait. A releasable cap is attached to a first end of the storage chamber to permit insertion of live bait. A containment and hooking chamber is axially positioned within the storage chamber and operably telescopes outside of a second end of the storage chamber. The containment and hooking chamber selectively receives live bait from the storage chamber through a first end of the containment and hooking chamber.

The containment and hooking chamber includes an immobilizing and hooking station at a second end to facilitate impalement of live bait on a fishing hook. The hooking station has a longitudinal channel extending away from the first end of the containment and hooking chamber. A slot extends longitudinally along the hooking station and has a depth so that the slot opens into the longitudinal channel. The slot is operable to guide a fishing hook into one side of the hooking station, through live bait which is securely positioned in the longitudinal channel of the hooking station, and finally out of the opposing side of the hooking station with the impaled bait attached.

An end closure is releasably attached to the first end of the containment and hooking chamber. The end closure includes an aperture for permitting of an angler to selectively blow our "puff" air into the containment and hooking chamber. Externally applied air pressure forces live bait, contained within the containment and hooking chamber, into the longitudinal channel of the hooking station in a position appropriate for impalement. Once blown inside the channel, a cricket's back legs are extended and the cricket is immobilized for hooking.

THE DRAWINGS

Other objects and advantages of the present invention will become apparent form the following detailed description of a preferred embodiment thereof taken in conjunction with the accompanying drawings, wherein.

DETAILED DESCRIPTION

Figure 1:
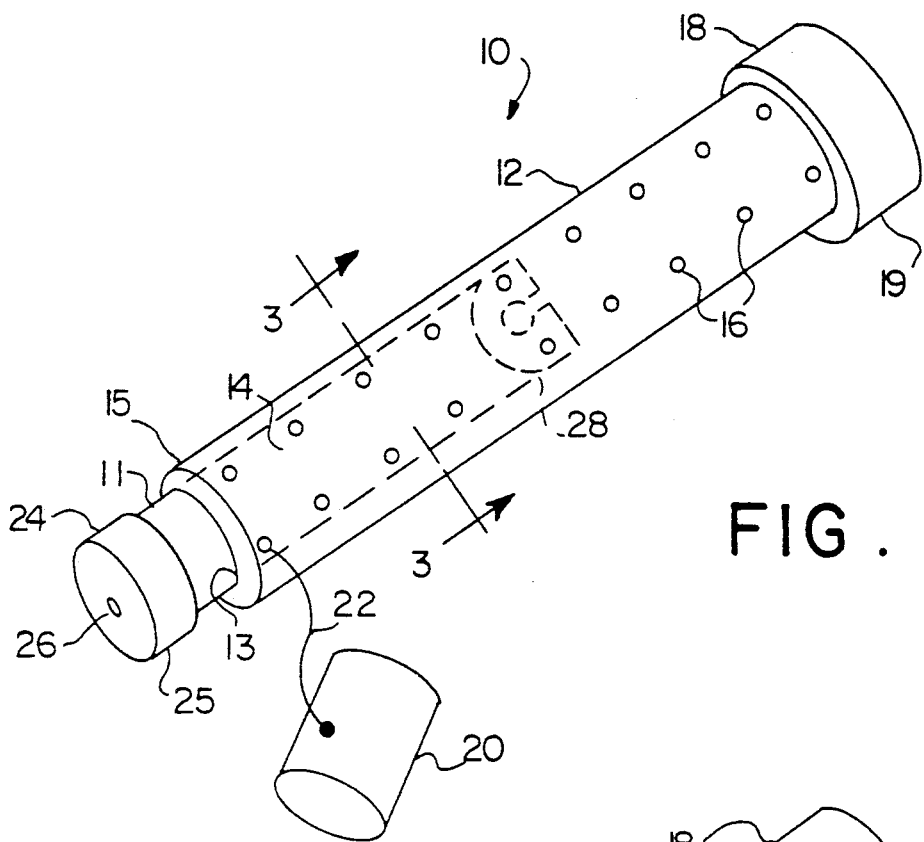
FIG. 1 is an axonometric view disclosing the context of the subject invention and depicts a containment and hooking chamber axially positioned within a storage chamber in a normal storage mode.

Referring now to the drawings, wherein like numerals indicate like parts, and initially to FIG. 1, there will be seen a preferred embodiment of the subject invention convenient for general storage purposes of one hundred or so crickets or comparable live fish bait. More particularly, a bait confinement and dispensing apparatus 10 is shown and includes a generally cylinderical storage chamber 12 and a generally cylinderical containment and hooking chamber 14. The containment and hooking chamber 14 is axially aligned within the storage chamber 12. The exterior surface 11 of the containment and hooking chamber 14 slidably contacts the interior surface 13 of a first end 15 of the storage chamber 12 so that the containment and hooking chamber 14 may be telescoped into the storage chamber 12 without permitting the escape of live bait that is contained within the storage chamber 12.

The storage chamber 12 is fashioned with a plurality of air ventilation passages 16 so that bait contained within the storage chamber 12 may be provided with sufficient air to remain alive. A cap 18 for loading the apparatus 10 with bait is releasably attached to a second end 19 of the aerated storage chamber 12. The storage chamber 12 is filled with live bait by removing the cap 18, inserting the bait through the opening provided by removal of the cap 18, and then replacing the cap 18 to prevent the live bait from escaping from the storage chamber 12. Once the bait is placed inside the storage chamber 12, the angler will have no occasion to physically contact the bait further.

A plug 20 is attached to the storage chamber 12 by an anchoring line 22 so that, when the hooking and containment chamber 14 is removed from the storage chamber 12, bait remaining in the storage chamber 12 will be confined indefinitely within the storage chamber 12.

An end closure 24 is releasably attached to a first end 25 of the containment and hooking chamber 14. The end closure 24 includes a small aperture 26 to permit the passage of a "puff" of air into the interior of the containment and hooking chamber 14. A second end of the containment and hooking chamber 14 includes a hooking station 28 which operably facilitates impalement of live bait.

The bait confinement and dispensing apparatus 10 may be fabricated from plastic or a structurally similar material.

Figure 2:
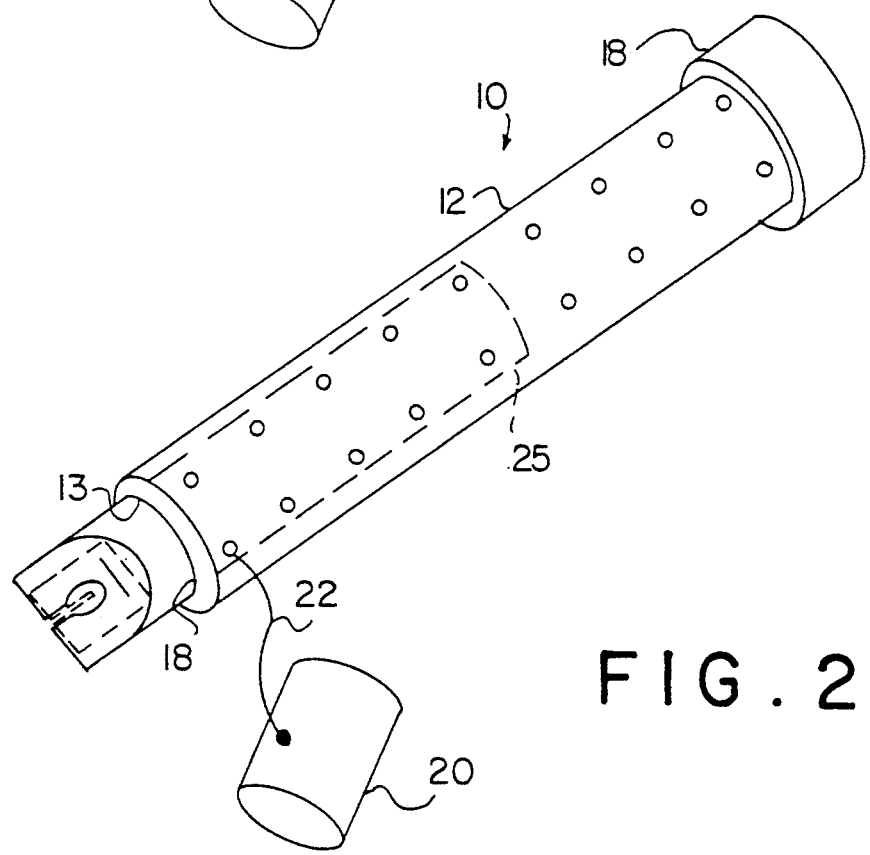
FIG. 2 is an axonometric view of the present invention disclosing the containment and hooking chamber axially positioned within the storage chamber in a mode to load bait from the storage chamber into the containment and hooking chamber.

FIG. 2 illustrates the bait confinement and dispensing apparatus 10 in a preferred embodiment for loading the containment and hooking chamber 14 with live bait from the storage chamber 12. To load the bait, an angler removes the end closure 24 and rotates the containment and hooking chamber 14 one hundred and eighty degrees from its storage configuration as previously described in association with FIG. 1. The angler then telescopes the containment and hooking chamber 14 into the storage chamber 12 and inverts the entire apparatus 10 to gravitationally force bait into the containment and hooking chamber 14.

Once filled with a desired amount of bait, the containment and hooking chamber 14 is slidably removed from the storage chamber 12. The storage chamber 12 may then be securely closed placing the plug 20 in the area vacated by the containment and hooking chamber 14.

Finally, the end closure 24 is attached to the first end 25 of the containment and hooking chamber 14 to confine the bait within the hooking chamber 14. Since an angler may hold the confinement and dispensing apparatus 10 at an angle to deny the bait in chambers 12 and 14 a route of escape, loading bait into the containment and hooking chamber 14 may be completed efficiently and expeditiously.

Figure 3:
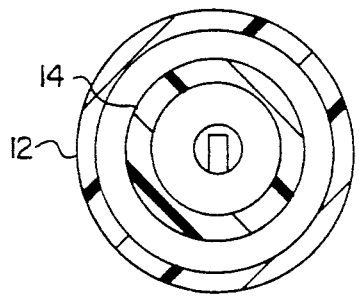
FIG. 3 is a cross-sectional detailed view disclosing the axial positioning of the containment and hooking chamber within the storage chamber, as taken along section line 3—3 in FIG. 1.

FIG. 3 is a cross-sectional view of the apparatus 10 as taken along section line 3—3 of FIG. 1 and illustrates the relative positioning and axial alignment of the containment and hooking chamber 14 with respect to the storage chamber 12. The containment and hooking chamber 14 is spaced apart from the storage chamber 12 along the length of the containment and hooking chamber 14 to a point proximal to the first end 15 of the storage chamber 12.

Figure 4:
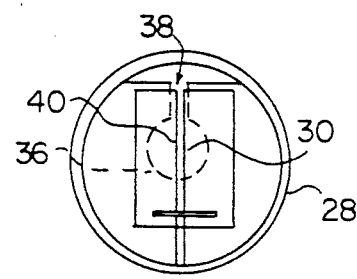
FIG. 4 is a longitudinal cross-sectional view of the containment and hooking chamber which includes a hooking station having a longitudinal channel and a releasably attachable end closure which permits a user to apply external air pressure to the interior of the containment and hooking chamber to force a live cricket into the immobilizing longitudinal channel.

FIG. 4 discloses an operative context of an interior portion of the containment and hooking chamber 14. The interior of the containment and hooking chamber 14 gradually converges to form a longitudinal channel 30 through a generally conical area 32. The diameter of the longitudinal channel 30 is such that an insect lodged in the longitudinal channel 30 will be immobilized because its legs will be thrust or extended rearward. A flexible flap 34, in a normal posture, covers a ramped wall 36 of the hooking station 28. The flap 34 is hinged to the ramped wall 36 and prevents the insect from escaping from the longitudinal channel 30. The flat member 34 being transparent to permit passage of light and to present live bait within containment and hooking chamber 14 with the appearance of a route of escape from the interior portion of containment and hooking chamber 14.

In order to impale an insect 29 in the hooking station 28, the insect must be immobilized facing forward in the longitudinal channel 30 of the hooking station 28. The cricket is physiologically predisposed to face forward in the containment and hooking chamber 14 because the insect is unable to walk backwards due to the physiology of its leg structure and will attempt to escape from the chamber 14 through the channel 30. The generally conical area 32 mechanistically orients the cricket facing forward because the cricket is unable to travel up a ramped area in any direction other than forward.

The force of gravity may be utilized to propel the insect 29 towards the channel 30 by rotating the containment and hooking chamber 14 so that the distal end of the hooking station 28 points towards the ground. However, it is sometimes necessary to force the insect into the longitudinal channel 30 by blowing a short blast or quick "puff" of air through the aperture 26 of the end closure 24. The angler need only apply two puffs of air through the aperture 26 to firmly lodge a cricket in the longitudinal channel 30. This externally applied air pressure immobilizes the cricket and expedites the hooking process of a live but stationary cricket.

Figure 5:
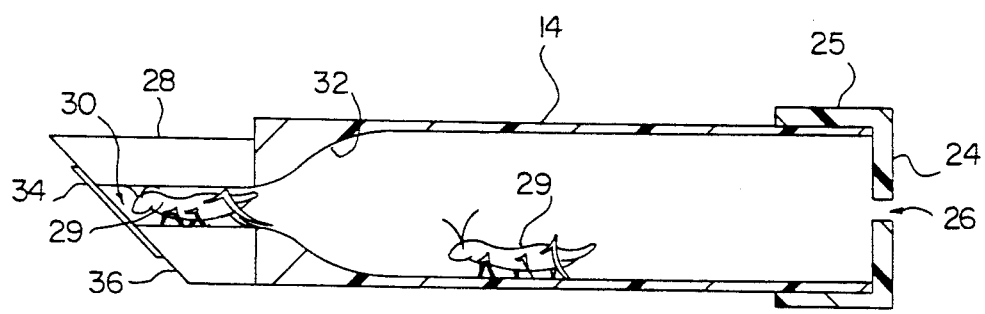
FIG. 5 is a detailed front view of a second end of the containment and hooking chamber which includes a flexible flap member to permit withdrawal of impaled bait from the containment and hooking chamber.

FIG. 5 is a detailed front view of the hooking station 28 of the containment and hooking chamber 14. The hooking station 28 includes a slot 38 which extends longitudinally through the hooking station 28 and opens into the longitudinal channel 30. The slot 38 is wide enough to permit passage of a fishing hook between its walls, yet prevents vertical movement of an insect lodged in the longitudinal channel 30. The flap 34 includes a slot 40 aligned with the slot 38 of the hooking station 28 to permit passage of a fishing hook.

Figure 6:
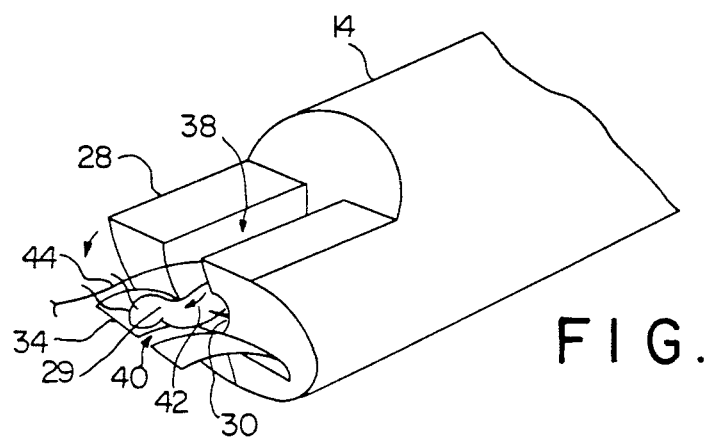
FIG. 6 is an axonometric view of the containment and hooking chamber disclosing an exit member in a flexed posture to permit exit of the hook and impaled bait from the hooking station.

Referring now to FIG. 6, the flap 34 conforms to a flexed posture as impaled bait is dispensed from the containment and hooking chamber 14. A barb 42 of a fishing hook 44 is guided down the slot 38 of the hooking station 28. The barb 42 penetrates the insect 29 and remains secured in the thorax of the insect 29. The fishing hook 44 is then manually guided from the hooking station 28 along the slot 38 so that the insect 28 is withdrawn from the longitudinal channel 30. The flap 34 flexes away from the ramped wall 36 of the hooking station 28 to permit exit of the insect 29 from the longitudinal channel 30. After the insect 29 is dispensed from the hooking station 28, the flap 34 returns to a normal posture flush with the ramped wall 36 to prevent the escape of any bait remaining in the containment and hooking chamber 14.

Once bait is dispensed from the containment and hooking chamber 14, the angler may reload the longitudinal channel 30 with bait by applying two puffs of air into the hooking chamber 14 through the aperture 26. The bait will remain lodged in the longitudinal channel 30, in position for impalement, until the angler is ready to rebait the fishing hook.

In instances when light fishing is anticipated, the angler may choose to carry only the containment and hooking chamber 14 per se to a fishing site and leave the larger storage unit 12 at a home site.

SUMMARY OF MAJOR ADVANTAGES OF THE INVENTION

After reading and understanding the foregoing novel confinement and dispensing apparatus and method for live bait, in conjunction with the drawings, it will be appreciated that several distinct advantages of the subject invention are obtained.

Without attempting to set forth all of the desirable features of the instant confinement and dispensing apparatus 10, at least some of the major advantages of the invention include an aperture 26 fashioned in an end closure 24 which is operably attached to a containment and hooking chamber 14. The inclusion of an aperture 26 permits an angler to advantageously utilize a method of blowing puffs of air into the containment and hooking chamber 14 and thereby force an insect contained within the chamber 14 into a longitudinal channel 30 of a hooking station 28. The blowing action requires little user effort and supplements the force of gravity in positioning the insect 29 in a posture appropriate for impalement.

A generally conical area 32 of the chamber 14 converges into the longitudinal channel 30 and insures that an insect will be guided into the longitudinal channel 30 when air pressure or gravity are applied to the chamber 14. The size of the longitudinal channel 30 of the hooking station 14 is such that the rear legs of the insect are pinned behind it, thereby immobilizing the insect. A flap 34 attached to a ramped wall 36 of the hooking station 28 prevents the insect from moving horizontally forward and escaping prior to being hooked by an angler.

A slot 38 cut into the hooking and containment chamber 14 permits an angler to guide a fishing hook 44 along the longitudinal channel 30 and thereby impale bait immobilized in the channel 30. The flap 34 has slot 40 aligned with the slot 38 of the hooking station 28 which permits exit of the shank of the fishing hook 44 from the hooking station 28 during withdrawal of impaled bait. The slots 38 and 40 permit easy access to the bait and make it unnecessary for an angler to physically contact an insect.

The longitudinal channel 30 permits entrance of only a single insect into the hooking chamber 28 and thus prevents many insects from escaping from the containment and hooking chamber 14 when an angler replaces lost bait on a fishing hook.

The air ventilation passages 16 of the storage chamber 12 provide air to the insects contained within the chamber 12. Anglers achieve better results when fishing with live bait because live bait action increases the likelihood of predation.

The containment and hooking chamber 14 is a separate, self-contained compartment from the storage chamber 12, and thus an angler needs only to access the containment and hooking chamber 14 for impalement and dispensation of an insect. The containment and hooking chamber 14 may be carried by the angler in a pocket and is thus easily accessable.

The confinement and dispensing apparatus 10 is constructed from plastic or a similar material and is therefore lightweight, rust-proof, cost-effective and easily manufactured. Further, the configuration of the confinement and dispensing apparatus 10 is such that it is easy to assemble for use and disassemble for cleaning.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which will fall within the purview of the subject invention and claims.

What is claimed is:

1. A confinement and dispensing apparatus for live fishing bait of the type including crickets, grasshoppers or the like, said confinement and dispensing apparatus comprising:
   a storage chamber having at least one air ventilation passage and being operable to contain live bait within said storage chamber;
   means for inserting live bait into said storage chamber; and
   a containment and hooking chamber axially positioned at one end of said storage chamber and being operable to facilitate hooking engagement and removal of live bait from said storage chamber, said containment and hooking chamber including,
   a first end of said containment and hooking chamber operable to allow passage of live bait from an interior portion of said storage chamber to an interior portion of said containment and hooking chamber,
   a hooking station at a second end of said containment and hooking chamber operable for facilitating impaling live bait upon a fishing hook, said hooking station having a longitudinal channel extending away from said first end of said containment and hooking station, and
   an end closure operable to be releasably attached to said first end and having an aperture for permitting the passage of air into said containment and hooking chamber such that externally applied air pressure operably forces live bait contained within said containment and hooking chamber toward said longitudinal channel, and
   at least one slot extending longitudinally along said hooking station and having a depth such that said at least one slot opens into said longitudinal channel, said at least one slot operable to guide a hook from one side of said hooking station through live bait positioned in said hooking station and to permit exit of the hook from said hooking station with live bait attached.

2. A confinement and dispensing apparatus for live bait as defined in claim 1 and further comprising:
   capping means for containing live bait within said storage chamber when said containment and hooking chamber is not positioned within said storage chamber.

3. A confinement and dispensing apparatus for live bait as defined in claim 1 wherein said hooking station further comprises:
   a flap member affixed to a distal end of said hooking station and having a slot aligned with said at least one slot of said hooking station, said flap member being hinged to said hooking station in a manner such that in a normal posture said flap member operably covers said distal end of said hooking station and retains live bait within said hooking station and in an outwardly flexed posture said flap member permits withdrawal of impaled live bait from said hooking station.

4. A confinement and dispensing apparatus for live bait as defined in claim 3 wherein:
   said storage chamber being generally cylindrical in shape and having a plurality of radially directed air ventilation apertures extending through sidewalls of said storage chamber.

5. A confinement and dispensing apparatus for live bait as defined in claim 4 wherein:
   said hooking chamber being generally cylindrical in shape and, when positioned within said storage chamber, being axially aligned with said storage chamber and operable to telescope into said storage chamber.

6. A confinement and dispensing apparatus for live bait as defined in claim 3 wherein said hooking station further comprises:
   a ramped portion located at said second end of said hooking station, said flap member being pivotally affixed to said ramped portion.

7. A confinement and dispensing apparatus for live bait as defined in claim 3 wherein:
   said flap member being transparent to permit passage of light and to present live bait within said containment and hooking chamber with the appearance of a route of escape from said interior portion of said containment and hooking chamber.

8. A confinement and dispensing apparatus for live bait as defined in claim 1 wherein:
   said longitudinal channel is conical in interior configuration such that live bait entering said longitudinal channel is operably guided head-first into a decreasing volume with its legs extended rearwardly and thus is unable to reverse its direction away from said hooking station.

9. A confinement and dispensing apparatus for live fishing bait of the type including crickets, grasshoppers or the like, said confinement and dispensing apparatus comprising:
   a containment and hooking chamber having at least one air ventilation passage and being operable to contain live bait and to facilitate impaling live bait upon a fishing hook, said containment and hooking chamber including,
   a first end, a hooking station at a second end of said containment and hooking chamber operable for facilitating hooking engagement, said hooking station having a longitudinal channel extending away from said first end of said containment and hooking station, and an end closure operable to be releasably attached to said first end and having an aperture for permitting the passage of air into said containment and hooking chamber such that externally applied air pressure operably forces live bait contained within said containment and hooking chamber toward said longitudinal channel, and at least one slot extending longitudinally along said hooking station and having a depth such that said at least one slot opens into said longitudinal channel, said at least one slot operable to guide a hook from one side of said hooking station through live bait positioned in said hooking station and to permit exit of the hook from said hooking station with live bait attached.

10. A confinement and dispensing apparatus for live bait as defined in claim 9 wherein said hooking station further comprises:

a flap member affixed to a distal end of said hooking station and having a slot aligned with said at least one slot of said hooking station, said flap member being hinged to said hooking station in a manner such that in a normal posture said flap member operably covers said distal end of said hooking station and retains live bait within said hooking station and in an outwardly flexed posture said flap member permits withdrawal of impaled live bait from said hooking station.

11. A confinement and dispensing apparatus for live bait as defined in claim 10 wherein said hooking station further comprises:

a ramped portion located at said second end of said hooking station, said flap member being pivotally affixed to said ramped portion.

12. A confinement and dispensing apparatus for live bait as defined in claim 10 wherein:

said flap member being transparent to permit passage of light and to present live bait within said containment and hooking chamber with the appearance of a route of escape from said interior portion of said containment and hooking chamber.

13. A confinement and dispensing apparatus for live bait as defined in claim 9 wherein:

said longitudinal channel is conical in interior configuration such that live bait entering said longitudinal channel is operably guided head-first into a decreasing volume with its legs extended rearwardly and thus is unable to reverse its direction away form said hooking station.

14. A method for confining and dispensing live bait of the type including crickets, grasshoppers or the like, said method comprising the steps of:

inserting live bait into a storage chamber;

transferring at least a portion of said live bait from the storage chamber into a containment and hooking chamber, the containment and hooking chamber having a hooking station fashioned at one end with a longitudinally extending central channel and a longitudinally extending slot fashioned from an exterior portion of said containment and hooking chamber into the central channel;

blowing live bait from the containment and hooking chamber into the central channel;

hooking the live bait by extending a barb portion of a fish hook through the slot and pulling longitudinally; and withdrawing the hooked live bait from the channel by pulling the hook past a retaining member positioned at a distal end of said channel.

15. A method for confining and dispensing live bait as defined in claim 14 wherein said step of blowing comprises:

applying two puffs of air into an end of the containment and hooking chamber opposite to the hooking station.

16. A method for confining and dispensing live bait of the type including crickets, grasshoppers or the like, said method comprising the steps of:

inserting live bait into a containment and hooking chamber, the containment and hooking chamber having a hooking station fashioned at one end with a longitudinally extending central channel and a longitudinally extending slot fashioned from an exterior portion of said containment and hooking chamber into the central channel;

blowing live bait from the containment and hooking chamber into the central channel;

hooking the live bait by extending a barb portion of a fish hook through the slot and pulling longitudinally; and withdrawing the hooked live bait from the channel by pulling the hook past a retaining member positioned at a distal end of said channel.

17. A method for confining and dispensing live bait as defined in claim 16 wherein said step of blowing comprises:

applying two puffs of air into an end of the containment and hooking chamber opposite to the hooking station.

* * * * *